United States Patent [19]

Choi

[11] Patent Number: 5,617,395

[45] Date of Patent: Apr. 1, 1997

[54] DISC LOADING APPARATUS FOR A FRONT LOADING DISC PLAYER

[75] Inventor: Young S. Choi, Seoul, Rep. of Korea

[73] Assignee: Daewoo Electronics Co., Ltd., Seoul, Rep. of Korea

[21] Appl. No.: 338,147

[22] Filed: Nov. 9, 1994

[30] Foreign Application Priority Data

Nov. 11, 1993 [KR] Rep. of Korea ............... 93-23883
Nov. 11, 1993 [KR] Rep. of Korea ............... 93-23884

[51] Int. Cl.[6] ..................................... G11B 33/02
[52] U.S. Cl. .......................... 369/77.1; 369/75.2
[58] Field of Search .................. 369/77.1, 75.2, 369/75.1, 77.2

[56] References Cited

U.S. PATENT DOCUMENTS

| | | | |
|---|---|---|---|
| 4,672,598 | 6/1987 | Koken et al. | 369/75.2 |
| 4,692,916 | 9/1987 | Rouws | 369/75.2 |
| 4,773,057 | 9/1988 | Otsuka et al. | 369/75.2 |
| 4,794,583 | 12/1988 | Funabashi et al. | 369/75.2 |
| 4,825,429 | 4/1989 | Matsumoto | 369/75.2 |
| 4,845,700 | 7/1989 | Koizumi et al. | 369/75.2 |

*Primary Examiner*—Stuart S. Levy
*Assistant Examiner*—David D. Davis
*Attorney, Agent, or Firm*—Oliff & Berridge

[57] ABSTRACT

A disc loading apparatus for a disc player based on the front loading method is disclosed. Positioning ribs formed on the tray supporting steps of a tray holder are meshed during operation with rib guiding grooves which are formed on the bottom of a tray. Upper and lower carrying rollers which are closely contacted with a guide band, or a carrying gear which is closely contacted with a rack gear revolve in such a manner that the tray would enter into a tray holder stably and precisely, thereby making the tray run fast. Set rollers which are formed on the inside of the tray holder prevent the lifting of the tray, so that the tray would move more stably. Further, the upper and lower carrying rollers which are clad with rubber make the movement of the tray more precise, as well as preventing the generation of noise in the meshing portions.

4 Claims, 6 Drawing Sheets

DISC LOADING APPARATUS FOR A FRONT LOADING DISC PLAYER

BACKGROUND OF THE INVENTION

1. Field of the Invention

The present invention relates to a disc loading apparatus for disc player. More specifically, the present invention relates to a front loading type disc loading apparatus in which a tray to mount a disc such as an optical video disc, a digital audio disc or a compact disc is horizontally moved into the disc player, and then, the disc is loaded onto a turntable in a vertical direction.

2. Description of the Prior Art

A disc player is for recording and reproducing data on a disc such as an optical video disc, a digital audio disc or a compact disc, on which a magnetic or optical recording can be carried out. There are many kinds of apparatus for loading and unloading a disc to and from the disc player. Of them, the most frequently used one is the front loading type disc loading apparatus in which a tray for mounting a disc is horizontally moved into the disc player, and then, the disc is loaded onto a turntable in a vertical direction.

One of these conventional front loading type disc loading apparatuses is provided with a cylindrical roller inserted into a guide groove of a side of the tray, so that the tray for mounting a disc would move horizontally and stably along the groove. This disc loading apparatus is disclosed in U.S. Pat. Nos. 4,807,216 and 5,084,854. Meanwhile, another type is provided with a rack and revolving rollers, so that the rack and tray would be horizontally moved in a stable manner. This disc loading apparatus is disclosed in U.S. Pat. Nos. 4,794,583 and 4,825,429.

Such conventional disc loading apparatus will be described in further detail referring to FIG. 1.

A disc-mounting tray 10 is provided with a guide rib 14 on a side thereof in the lengthwise direction, i.e., in the tray carrying direction. A base plate 12 which is located below the tray 10 is provided with a guide groove 15 on a side wall thereof in the lengthwise direction, i.e., in the tray carrying direction corresponding with guide rib 14. Thus guide rib 14 is movably inserted into guide groove 15. Meanwhile, the other side of the tray, on which guide rib 14 is not formed, is provided with a rack gear 11. Rack gear 11 is coupled with a driving means 13 which is installed at a corresponding position upon base plate 12. Driving means 13 consists of a loading motor 16, a transmitting gear 17 and a carrying gear 18, carrying gear 18 being coupled with loading motor 16 and transmitting gear 17. Carrying gear 18 and rack gear 11 of tray 10 are meshed together, and therefore, when loading motor 16 revolves, tray 10 moves straightly forward and backward in accordance with the revolution direction of loading motor 16. Such straight motions of tray 10 are stably maintained by guide groove 15 (formed on a side of base plate 12) and by guide rib 14 of tray 10.

However, in this conventional disc loading apparatus, there is a tolerance in the meshing between guide rib 14 of tray 10 and the guide groove of base plate 12. Therefore, the forward and backward movements of tray 10 are not precise. Further, rack gear 11 of tray 10 and carrying gear 18 of driving means 13 are all made of a synthetic resin, and therefore, when they actuate being meshed together, they generate noise.

SUMMARY OF THE INVENTION

The present invention is intended to overcome the above described disadvantages of the conventional techniques.

Therefore it is an object of the present invention to provide a disc loading apparatus in which the forward and backward movements of the tray and the consequent disc loading operation are more accurately carried out owing to the unique geometric configuration of the tray and the base plate.

In achieving the above object, the present invention provides a disc loading apparatus which comprises:

a tray for mounting a disc, and including a pair of steps formed in parallel with each other by being bent outward from the lower edges of the tray, one or more of rib guiding grooves being formed on the bottoms of the steps in the lengthwise direction thereof;

a tray holder for allowing the tray to run through it, and including a pair of tray supporting steps formed in parallel with each other by being bent inward from the lower edges of the tray holder, positioning ribs being formed on the upper faces of the tray supporting steps in the lengthwise direction, the positioning ribs being meshed with the rib guiding grooves;

a guide band portion formed on the outer face of a side wall of the tray in parallel with one of the steps keeping a distance from the steps, and extending a certain distance in parallel with the step, the front and rear ends of the guide band portion being bent down to contact with the step; and a carrying means for being driven by a driving means in a close contact with the upper and lower faces of the guide band portion.

In this case, carrying means preferably consists of upper and lower carrying rollers. The tray holder preferably is provided with set rollers at positions on the inside of the side wall opposite to the guide band portion so as to prevent the lifting of the tray during the carrying of the tray within the tray holder, and the supporting step of the tray holder with the carrying means installed thereon preferably is provided with an inner wall formed by being bent upward from the inner edge of the step, a friction reducing projection being formed on the inner face of the inner wall in the lengthwise direction.

The carrying means of the disc loading apparatus, e.g., the upper and lower carrying rollers, are clad with rubber.

In achieving the above object, the present invention provides a disc loading apparatus which comprises:

a tray for mounting a disc, and including a pair of steps formed in parallel with each other by being bent outward from the lower edges of the tray, one or more of rib guiding grooves being formed on the bottoms of the steps in the lengthwise direction thereof;

a tray holer for allowing the tray to run through it, and including a pair of tray supporting steps formed in parallel with each other by being bent inward from the lower edges of the tray holder, positioning ribs being formed on the upper faces of the tray supporting steps in the lengthwise direction, the positioning ribs being meshed with the rib guiding grooves; and a rack gear integrally formed on the upper face of one of the steps of the tray for being meshed with a carrying gear, the carrying gear being rotated by a driving means.

To solve still further the above problems, the rack gear and the carrying gear of the disc loading apparatus are also clad with rubber.

Position ribs which are formed on the tray supporting step of the tray holder is engaged with rib guiding grooves which are formed on the bottom of the tray during operation.

Further, upper and lower carrying rollers which are closely contacted with the guide band, or a carrying gear which is closely contacted with a rack gear revolve in such a manner that the tray would slide into or out a tray holder thereby making the tray run stably and precisely through the tray holder. Further, set rollers which are formed on the inside of the tray holder prevent the lifting of the tray, so that the tray will move more stably. Further, the upper and lower carrying rollers which are clad with rubber make the movement of the tray more precise, as well as preventing the generation of noise in the engaging portions.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENTS

Hereinafter, the disc load player according to the present invention will be described in details with reference to the accompanying drawings.

Embodiment 1

Figure 1:
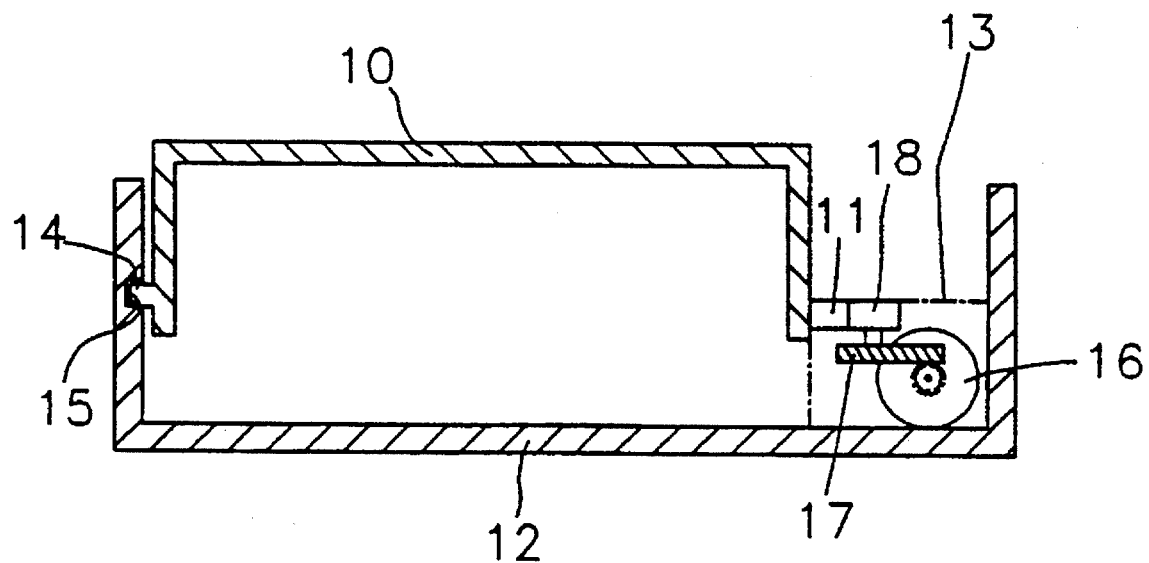
FIG. 1 is a schematic sectional view showing a conventional disc loading apparatus.
Figure 2:
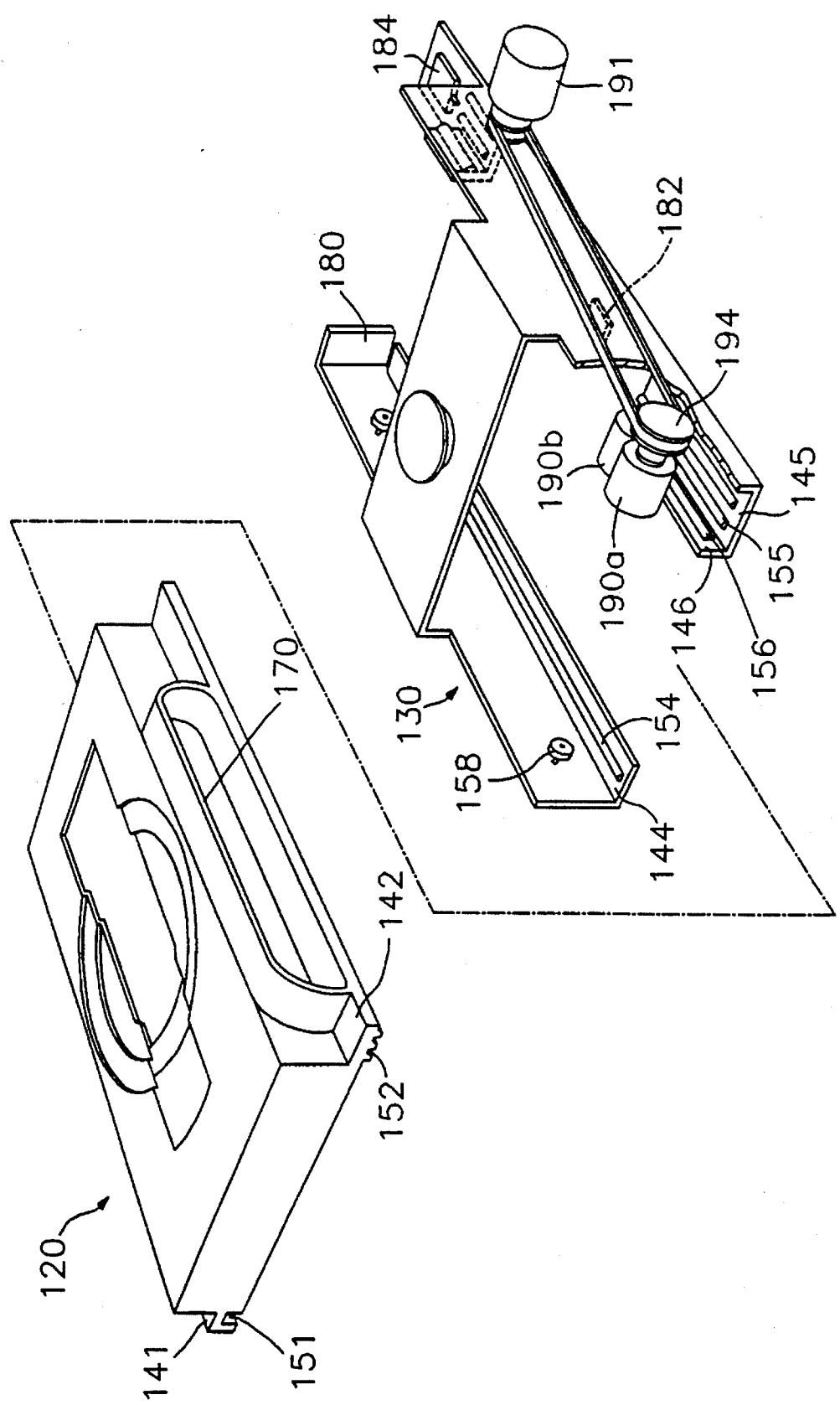
FIG. 2 is an exploded perspective view of a preferred embodiment of the disc loading apparatus according to the present invention.

FIG. 2 is an exploded perspective view showing a first embodiment of the present invention.

Reference numeral 120 indicates a tray on which a disc is mounted. Reference numeral 130 indicates a tray holder which tray 120 passes through to move horizontally forward and backward. Steps 141 and 142 are formed by being outwardly bent in a parallel form on the opposite sides of tray 120, while tray supporting steps 144 and 145 are formed by being inwardly bent from the lower ends of the opposite sides of tray holder 130. On tray supporting steps 144 and 145, there are provided positioning ribs 154 and 155, while on the bottom of the steps 141 and 142 of tray 120, there are provided rib guide grooves 151 and 152 which are engaged with positioning ribs 154 and 155. Further, the edge of tray supporting step 145 is upwardly bent so as to form an inner wall 146 on which a projected portion 156 is formed. The positioning ribs may be provided with as many as wanted, and so many rib guide grooves should be provided with. A guide band portion 170 is formed integrally with a side of tray 120 and kept a certain distance from step 142. Guide band portion 170 extends in parallel with step 142 over a certain distance, and the ends of guide band portion 170 are bent down to be in contact with step 142. That is, guide band portion 170 is formed integrally with the side of tray 120 and with step 142.

Figure 3:
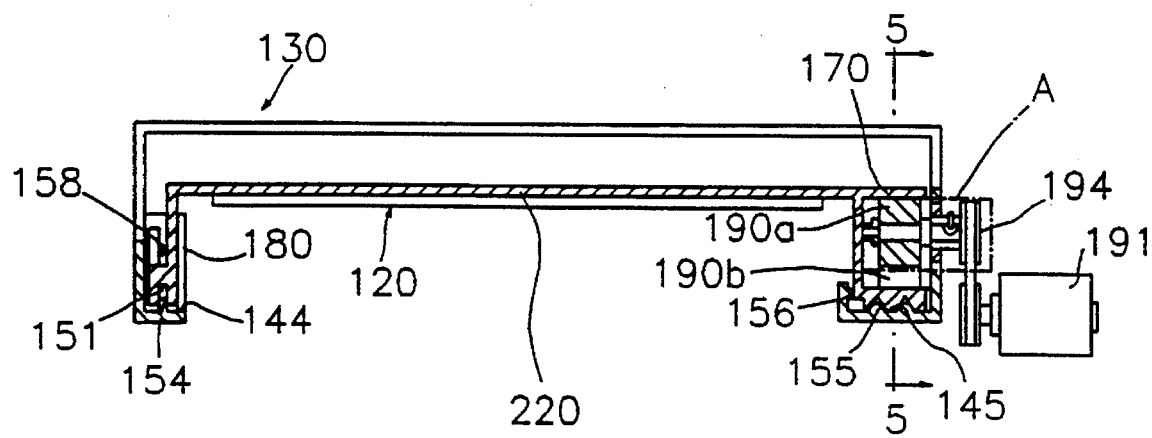
FIG. 3 is a frontal sectional view showing the disc loading apparatus of FIG. 2.
Figure 4:
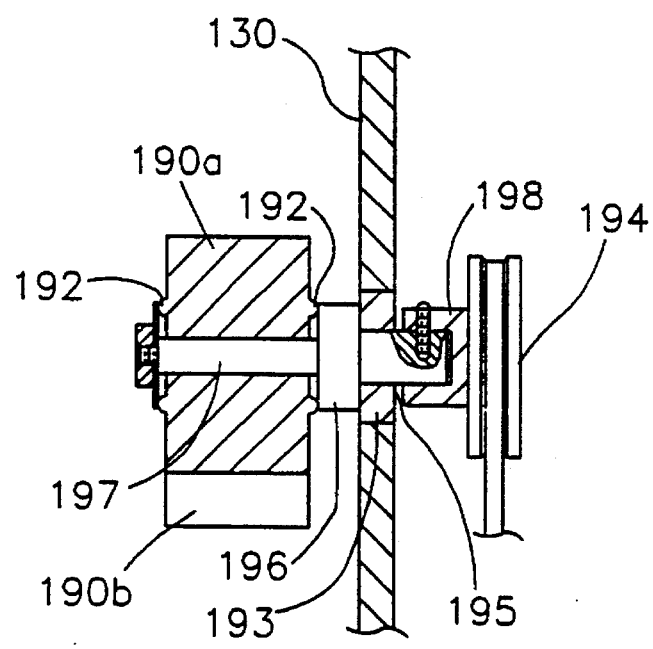
FIG. 4 is an enlarged view of a portion A of FIG. 3.

Referring to the front sectional view of FIGS. 2, 3 and 4 rib guide grooves 151 and 152 of steps 141 and 142 of tray 120 are engaged with position ribs 154 and 155 of supporting steps 144 and 145 of tray holder 130, so that tray 120 will be able to run within tray holder On the inside of supporting steps 145 of tray holder 130 corresponding to the position of guide band portion 170, there is set a first carrying limiting position, and a first limit switch 182 is installed on the position. On the rear portion of the upper face of supporting step 145, there is set a second carrying limiting position, and a second limit switch 184 is installed on this position. Further, on the rear portion of supporting step 144 of tray holer 130, there in integrally formed a stopper 180.

An upper carrying roller 190a and a lower carrying roller 190b are made to closely contact with guide band portion 170 by being connected with a gear shaft supporting boas 196, so that tray 120 may be able to move forward and backward when driven by a loading motor 191.

As shown in FIGS. 3 and 4, on a side wall of tray holder 130, there is formed an insertion hole 195 corresponding with the positions of the upper and lower carrying rollers which are installed within guide band portion 170. A gear shaft 197 which is extended to gear shaft supporting boss 196 which is connected to carrying rollers 190a and 190b is inserted into insertion holes 195. Further, an oilless bearing 193 is installed within insertion hole 195. Further, the outer end of gear shaft 197 is coupled with a shaft insertion boss 198 which is projected on a pulley 194. On the circular surfaces of the front and rear ends of carrying rollers 190a and 190b, there are formed friction reducing projections 192 for reducing the frictions which are generated in relation with the gear shaft supporting boss during its revolutions. The surfaces of upper and lower carrying rollers 190a and 190b are clad with rubber, thereby forming a disc loading apparatus.

As shown in FIG. 2, at a position of the inner face of the side wall of tray holder 130 corresponding with the other side wall opposite to guide band portion 170, there is installed a set roller 158, so that when the tray is carried within the tray holder, the lifting of the tray would be pressed down. The set roller may be installed as many as desired along the side wall of tray holder 130.

The disc loading apparatus of the first embodiment of the present invention constituted as above will now be described as to its operations.

Figure 5:
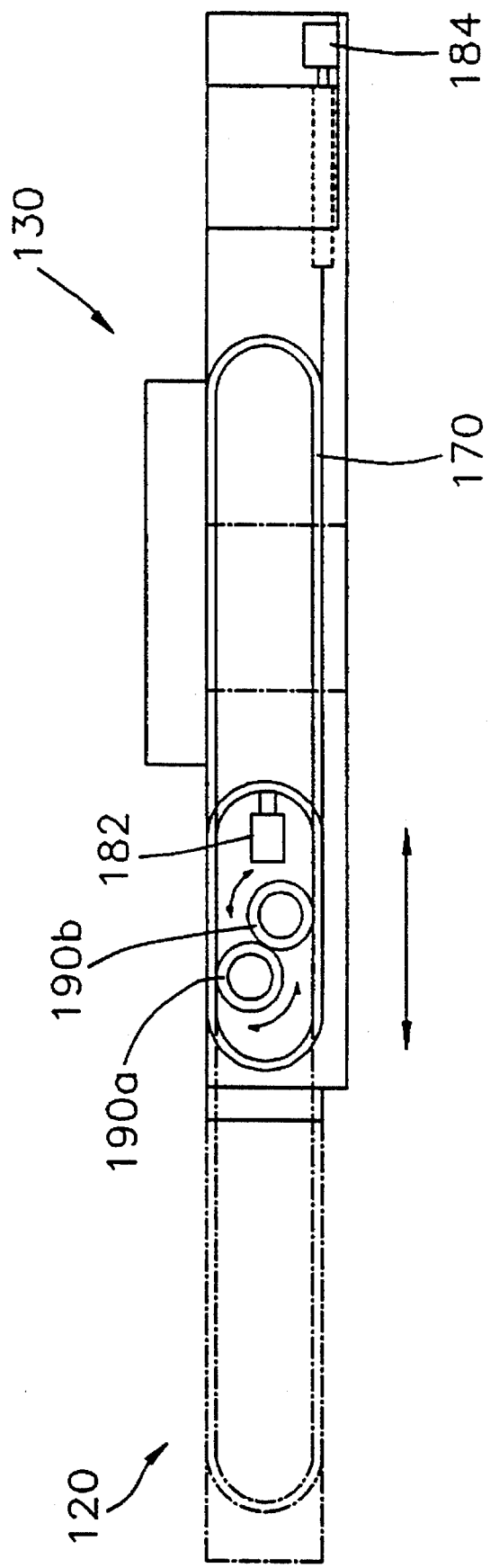
FIG. 5 is a side sectional view taken along a line 5—5 of FIG. 3.

FIG. 3 is a front sectional view showing tray 120 of FIG. 2 inserted into tray holder 130. When a disc is to be loaded into a disc player, the user presses an eject switch (not shown) provided on the front of the player body, so as to insert a disc into the player. Then loading motor 191 which is electrically connected with the eject switch is driven in a certain direction. Then pulley 194 is driven counterclockwise. Therefore, as shown in FIGS. 4 and 5, upper carrying roller 190a which is coupled with pulley 194 is rotated counterclockwise so as to push the upper face of the guide band portion forward (leftward in FIG. 5). At the same time, lower carrying roller 190b which is press-contacted with upper carrying roller 190a is rotated clockwise so as to push the lower face of guide band portion 170 forward, thereby carrying the tray forward.

Under this condition, tray 120 is carried forward by being guided by positioning ribs 154 and 155 which are inwardly bent from the opposite lower ends of tray holder 130. Under this condition, set rollers 158 which are installed on the side wall of tray holder 130 corresponding with guide band portion 170 press down step 141 of tray 120, so that the tray lifting phenomenon which is caused by the loading motor acting only on one side of tray 120 would be prevented. Thus when the forwardly moving tray 120 arrives at the limit switch, i.e., at the front carrying limiting position formed at the outer side wall of tray holder 130 (on the side where guide band portion 170 is formed), the rear inner face of guide band portion 170 of tray 120 activates limit switch 182, so that loading motor 191 will stop, and the forward carrying of tray 120 will be stopped.

Thus, in a state with tray 120 stopped, the user may load or replace a disc, and push in tray 120 again. Then loading motor 191 is driven in the opposite direction, and thus, pulley 194 and upper and lower carrying rollers 190a and 190b are rotated in the opposite direction. Thus the disc-mounting tray is carried into the disc player by being guided by the positioning ribs 154 and 155, while set rollers 158 prevent the lifting of tray 120. Thus when tray 120 which is being carried backward arrives to rear limit switch 184, i.e., the rear carrying limiting position of the upper rear end portion of supporting step 145 of tray holder 130 (on which guide band portion 170 is formed), the rear end of tray step 142 activates rear limit switch 184, so that the driving of loading motor 191 will be stopped, and the backward carrying of tray 120 will be stopped. Under this condition, tray 120 is prevented from a backward departure by stopper 180 which is integrally formed on the rear end portion of supporting step 344 of tray holder 130.

Thus when tray 120 is stopped at the predetermined position within the player body, for example, the spindle assembly including the turntable is elevated and clamped, that the disc will revolve through the selection of the play mode, and a feeding is made.

According to the first embodiment of the present invention, the following effects are obtained. That is, the tray carrying operation is precisely done owing to: the positioning ribs of the tray supporting steps (which are inwardly bent from the lower ends of sides of the tray holder); the rib guide grooves engaged with the positioning ribs and formed on the bottom of the steps (which are outwardly bent from the lower side ends of the tray); the upper and lower carrying rollers which are installed in a close contact with the upper and lower faces of the guide band portion; and the set rollers which are fixedly installed on the inside of the side wall of the tray holder. Further, the upper and lower carrying rollers which are clad with rubber are rotated in a close contact with the upper and lower faces of the guide band portion so as to carry the tray including the guide band portion forward and backward, and therefore, noise is not generated from the meshed portions during the carrying.

Embodiment 2

Now a second embodiment of the present invention will be described.

Figure 6:
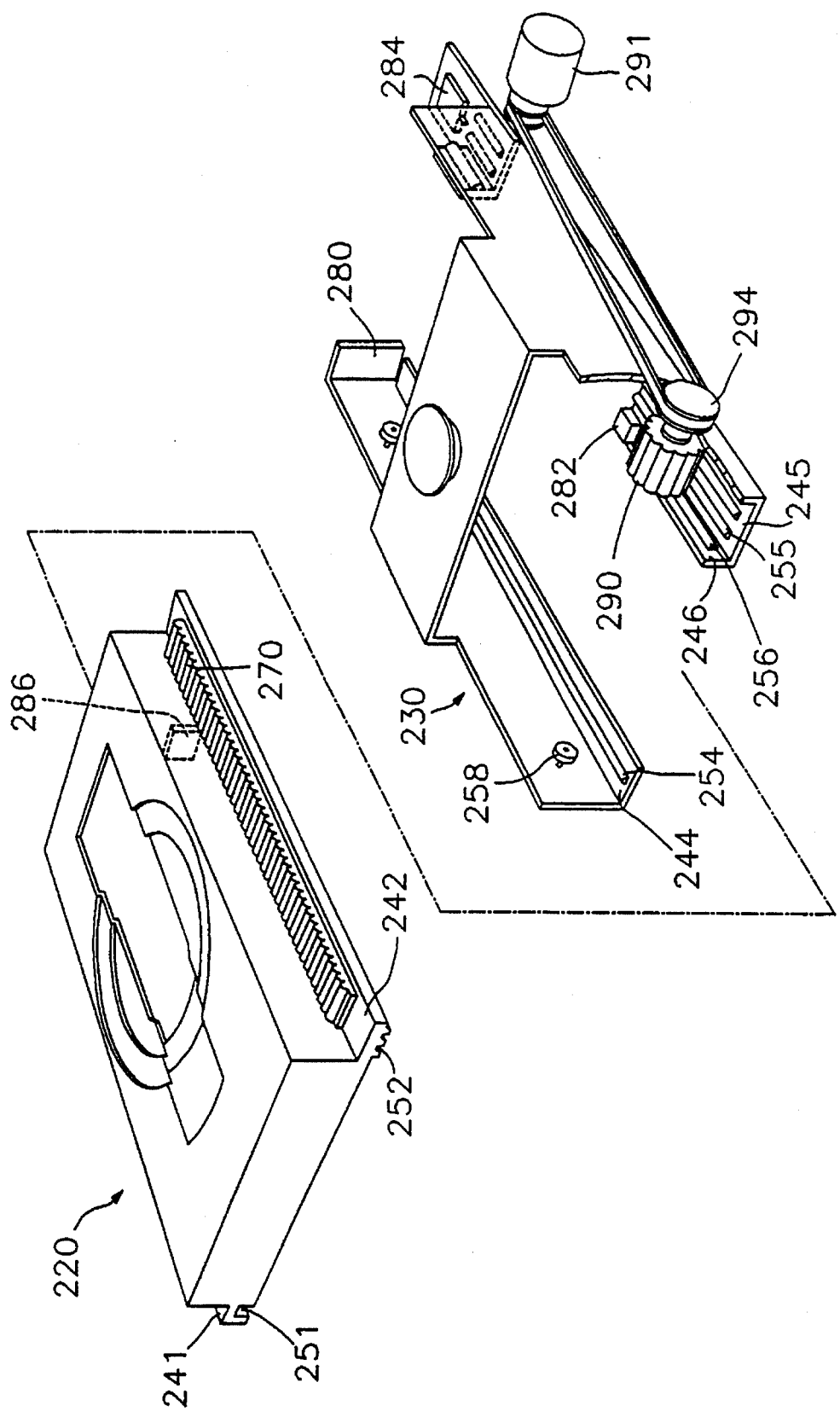
FIG. 6 is an exploded perspective view showing another embodiment of the disc loading apparatus according to the present invention.

FIG. 6 is an exploded perspective view showing a second embodiment of the present invention.

Reference numeral 220 indicates a tray on which a disc is mounted. Reference numeral 230 indicates a tray holder which tray 220 passes through to move horizontally forward and backward. Steps 241 and 242 are formed by being outwardly bent in a parallel form on the opposite sides of tray 220, while tray supporting steps 244 and 245 are formed by being inwardly bent from the lower ends of the opposite sides of tray holder 230. On tray supporting steps 244 and 245, there are provided positioning ribs 254 and 255, while on the bottom of steps 241 and 242 of tray 220, there are provided rib guide grooves 251 and 252 which are engaged with positioning ribs 254 and 255. Further, the edge of tray supporting step 245 is upwardly bent so as to form an inner wall 246 on which a projected portion 256 is formed. The positioning ribs may be provided with as many as wanted, so many rib guide grooves should be provided.

A rack gear portion 270 is integrally formed along a bent line on the upper face of step 242 of the tray.

Figure 7:
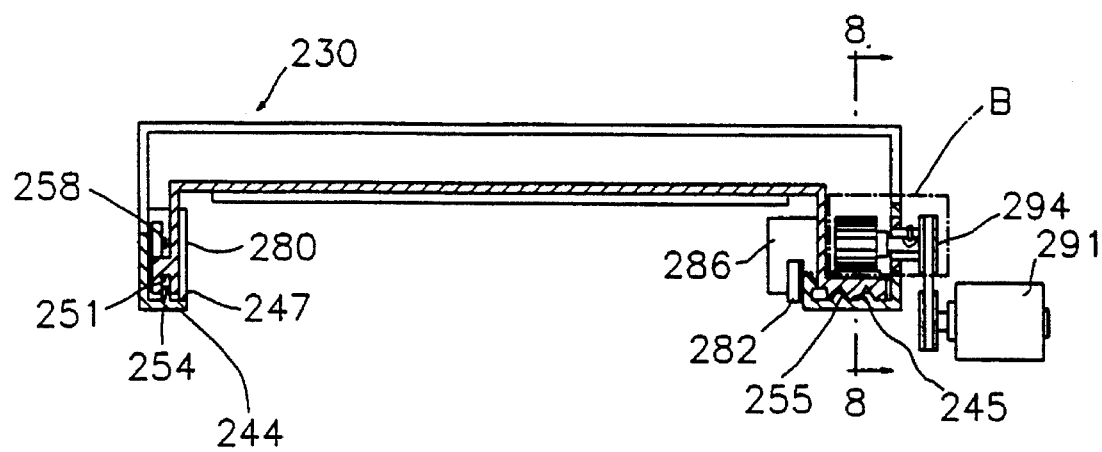
FIG. 7 is a frontal sectional view showing an assembled state of the disc loading apparatus of FIG. 6.

Referring to the assembled frontal sectional view of FIG. 7, rib guide grooves 251 and 252 of steps 241 and 242 of a tray 220 are meshed with positioning ribs 254 and 255 of a tray holder 230, so that tray 220 will be able to smoothly run within tray holder 230.

Further, a third carrying limiting position is set on the front portion of the inside of an inner wall 246 of supporting step 245 of tray holder 230 corresponding with rack gear portion 270. At the third carrying limiting position, there is installed a third carrying limit switch 282. Further, a fourth carrying limiting position is set on the rear portion of the upper face of supporting step 245, at which a fourth carrying limit switch 284 is installed. Further, a switch actuation piece 286 is installed on the rear portion of the inner side wall of tray 220 on which rack gear portion 270 is formed. Further, a stopper 280 is integrally formed on the rear portion of supporting step 244 of tray holder 230.

A carrying gear 290 is installed on tray holder 230, so that carrying gear 290 will be meshed with rack gear portion 270 of tray 220, and that tray 220 will move forward and backward in accordance with the driving of loading motor 291.

Figure 8:
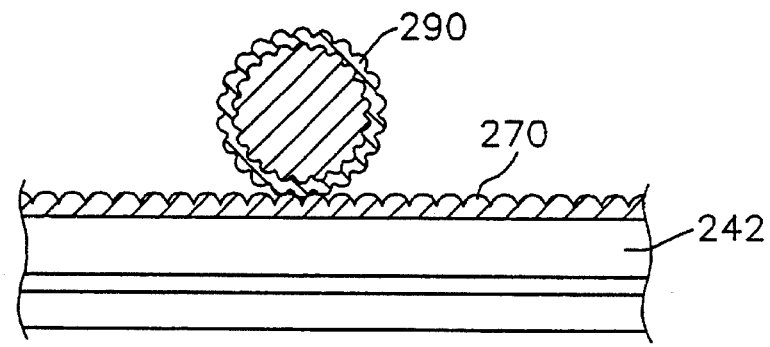
FIG. 8 is a side sectional view taken along a line 8—8 of FIG. 7.
Figure 9:
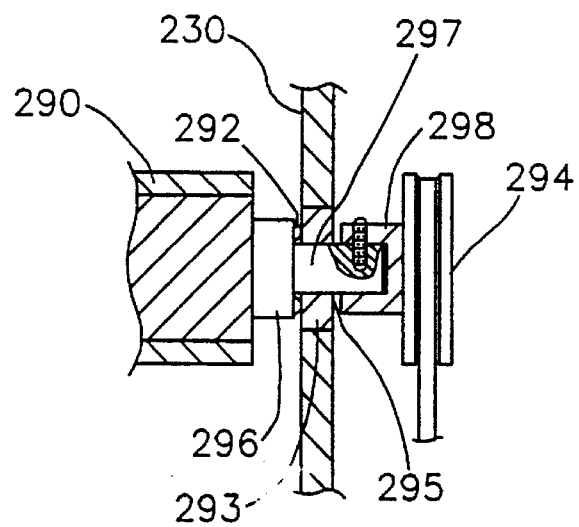
FIG. 9 is an enlarged view of a portion B of FIG. 7.

As shown in FIGS. 7 to 9, a gear shaft 297 which is extended to gear shaft supporting boss 296 which is connected to carrying gear 290, and gear shaft 297 is inserted into insertion hole 295. Further, an oilless bearing 293 is installed within insertion hole 295. Further, the outer end of gear shaft 297 is coupled with a shaft insertion boss 298 which is projected on a pulley 294. On the circular surfaces of one end of gear shaft supporting boss 296, there are formed friction reducing projections 292 for reducing the frictions which is generated in relation with the gear shaft supporting boss during its revolutions.

Further, rack gear portion 270 and/or carrying gear 290 are clad with rubber.

As shown in FIG. 6, at a predetermined position on the inside of a side wall of tray holder 230 corresponding with the side wall opposite to rack gear portion 270, there is fixedly installed a set roller 258 so that the lifting of tray 220 during its carrying within the tray holder will be prevented. Set rollers 258 may be installed with as many as desired along the side wall of tray holder 230.

The second embodiment of the present invention constituted as above will now be described as to its operations.

FIG. 7 is a frontal sectional view showing tray 220 and tray holder 230 of FIG. 6 assembled together. When a disc is to be loaded into the disc player, first the user pushes an eject switch (not shown) which is provided on the front face of the player body. Then a loading motor 291 which is electrically connected to the eject switch is driven. Then a pulley 294 is rotated clockwise. Accordingly, as shown in FIGS. 8 and 9, carrying gear 290 which is coupled with pulley 294 is rotated clockwise, so that rack gear portion 270 which is engaged with the carrying gear will be pushed forward, and tray 220 will be carried forward. Then tray 220 is carried forward by being guided by the positioning ribs 254 and 255 of tray supporting steps 244 and 245 which are formed by being bent inward from the lower ends of tray holder 230. At the same time, set rollers 258 which are fixedly installed on the side wall of tray holder 230 opposite to rack gear portion 270 press down step 241 of tray 220, so that the lifting of the tray due to the action of the loading motor to one side of the tray will be prevented. Thus when tray 220 arrives at the front limit switch 282, i.e, at the front carrying limiting position of the inside of the inner wall of tray holder 230, switch actuation piece 286 of the inside of the side wall of tray 220 activates limit switch 282 of tray holder 230, so that the driving of loading motor 291 will be stopped, and the forward carrying of tray 220 will be stopped.

Thus, the user can load a disc or replace a disc, and then, may push tray 220 into the player body. Then loading motor 296 is driven in the opposite direction, and pulley 294 and carrying gear 290 are rotated in the opposite direction, i.e., counterclockwise. Thus the tray 220 on which a disc is loaded is carried backward, i.e., into the player body by being guided by positioning ribs 254 and 255. Under this condition, set rollers 258 prevent the lifting of tray 220.

When the tray which is being carried backward arrives at rear limit switch 284, i.e., at the rear carrying limiting position of supporting step 245 near rack gear portion 270, the rear end of tray step 242 activates rear limit switch 284, so that the driving of loading motor 291 will be stopped, and that the backward carrying of tray 220 will be stopped. Under this condition, tray 220 is prevented from a backward departure owing to stopper 280 which is integrally formed with the rear end portion of supporting step 244 of tray holder 230.

According to the second embodiment of the present invention as described above, the tray carrying operation is precisely done owing to: the positioning ribs formed on the tray supporting step inwardly bent from the lower edges of the opposite walls of the tray holder; the rib guiding grooves formed on the bottom of the steps outwardly bent from the lower edges of the opposite walls of the tray, the positioning ribs being engaged with the rib guiding grooves so as to make the tray run; the rack gear portion and the carrying gear engaged with it and the set rollers installed on the inside of one side wall of the tray holder. Further, the rack gear portion and/or the carrying gear which are engaged together are clad with rubber, and therefore, when the tray moves back or forth, noise is not generated from the meshed portions, thereby improving the product quality.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A disc loading apparatus for a front loading disc player, comprising:

a tray for mounting a disc, and including a pair of tray steps formed in parallel with each other by being bent outwardly from opposite lower edges of said tray, one or more of rib guiding grooves being formed on bottoms of said pair of tray steps in a lengthwise direction thereof;

a tray holder for allowing said tray to run therethrough, and including a pair of tray supporting steps formed in parallel with each other by being bent inwardly from opposite lower edges of said tray holder, positioning ribs being formed on upper faces of said pair of tray supporting steps in the lengthwise direction, said positioning ribs being meshed with said rib guiding grooves;

a guide band portion formed on an outer face of a side wall of said tray in parallel with one of said pair of tray steps kept at a distance from said one of said pair of tray steps, and extended to a certain distance in parallel with said one of said pair of tray steps, front and rear ends of said guide band portion being bent down to be in contact with said one of said pair of steps so that said guide band portion has an upper face and a lower face;

a carrying means having upper and lower carrying rollers installed within said guide band portion, said upper and lower carrying rollers clad with rubber and driven by a driving means in a close contact with the upper and lower faces of said guide band portion;

a first and a second limit switches for stopping forward and backward carrying of said tray, wherein said first limit switch installed at a predetermined first carrying limiting position on an inside of one of said pair of tray supporting steps and said second limit switch installed at a predetermined second carrying limiting position on an upper face of a rear end of said one of said pair of tray supporting steps, so that an inside of a rear end of said guide band portion would activate said first limit switch during the forward carrying of said tray and a rear end of said one of said pair of tray steps would activate said second limit switch during a backward carrying of said tray, thereby stopping the driving of said loading motor.

2. The disc loading apparatus as claimed in claim 1, wherein said tray holder is provided with set rollers at positions on an inside of a side wall opposite to said guide band portion so as to prevent lifting of said tray during forward and backward carrying of said tray within said tray holder.

3. The disc loading apparatus as claimed in claim 1, wherein the one of said pair of tray supporting steps of said tray holder with said carrying means installed thereon is provided with an inner wall formed by being bent upwardly from an inner edge of said one of said pair of tray supporting steps, a friction reducing projection being formed on an inner face of said inner wall in the lengthwise direction.

4. The disc loading apparatus as claimed in claim 1, further comprising a stopper integrally formed with a rear portion of the other one of said pair of tray steps of said tray so as to prevent backward departure of said tray.

* * * * *